United States Patent
Johnson et al.

(10) Patent No.: US 11,080,388 B2
(45) Date of Patent: Aug. 3, 2021

(54) AUTOMATIC EXTRACTION OF INFORMATION FROM OBFUSCATED IMAGE REGIONS

(71) Applicant: PAYPAL, INC., San Jose, CA (US)

(72) Inventors: Raoul Christopher Johnson, San Jose, CA (US); Bradley Wardman, Phoenix, AZ (US); Sai Raghavendra Maddhuri Venkata Subramaniya, West Lafayette, IN (US)

(73) Assignee: PayPal, Inc., San Jose, CA (US)

( * ) Notice: Subject to any disclaimer, the term of this patent is extended or adjusted under 35 U.S.C. 154(b) by 244 days.

(21) Appl. No.: 16/150,213

(22) Filed: Oct. 2, 2018

(65) Prior Publication Data

US 2020/0159907 A1 May 21, 2020

(51) Int. Cl.
| | |
|---|---|
| *H04L 29/06* | (2006.01) |
| *G06F 21/45* | (2013.01) |
| *G06T 7/10* | (2017.01) |
| *G06T 5/00* | (2006.01) |

(52) U.S. Cl.
CPC .............. *G06F 21/45* (2013.01); *G06T 5/001* (2013.01); *G06T 7/10* (2017.01); *H04L 63/1408* (2013.01); *G06T 2207/20076* (2013.01)

(58) Field of Classification Search
CPC . G06F 21/45; G06T 7/10; G06T 5/001; G06T 2207/20076; H04L 63/1408

USPC .......................................................... 726/26
See application file for complete search history.

(56) References Cited

U.S. PATENT DOCUMENTS

| | | | |
|---|---|---|---|
| 2008/0118150 A1* | 5/2008 | Balakrishnan | G06F 40/157 |
| | | | 382/176 |
| 2016/0294781 A1* | 10/2016 | Ninan | G06F 21/6245 |
| 2018/0150645 A1* | 5/2018 | Toshok | G06F 21/6254 |
| 2019/0120950 A1* | 4/2019 | Tanaka | H04N 5/23212 |
| 2019/0286806 A1* | 9/2019 | Robinson | G06F 21/35 |

\* cited by examiner

*Primary Examiner* — Evans Desrosiers
(74) *Attorney, Agent, or Firm* — Haynes and Boone, LLP

(57) ABSTRACT

Images related to one or more attacks to a service provider system may be analyzed to improve the security of the service provider system. Each of the images may be segmented into multiple segments. Each of the segments is analyzed independently to determine whether the segment includes obfuscated data and if so, which one of the data obfuscation techniques was used to generate the obfuscated data. Additional information regarding the obfuscated data may be derived from other segments that include unobfuscated data and from the metadata of the image. A data restoration algorithm may be configured accordingly to restore the obfuscated data. The restored data, as well as a context derived for the image, may be used to adjust one or more security parameters of the service provider system to improve the security of the service provider system.

20 Claims, 7 Drawing Sheets

AUTOMATIC EXTRACTION OF INFORMATION FROM OBFUSCATED IMAGE REGIONS

BACKGROUND

The present specification generally relates to image processing, and more specifically, to automatically extracting information from obfuscated regions within an image according to various embodiments of the disclosure.

RELATED ART

Providers of electronic services (e.g., online services) are constantly under attack from malicious users with the intention of disrupting electronic services, obtaining personal gain, or both. Examples of such attacks include denial-of-service attacks, account take-overs, thefts of account property by way of performing fraudulent electronic transactions, etc. Even with advanced security measures, malicious users are still able to find ways to continue to launch attacks against electronic services.

After a malicious user successfully performs an attack against an electronic service provider, the malicious user would sometimes communicate information of such an attack to others over the Internet. For example, the malicious user may communicate a proof that she has taken over an account of another user or that she has successfully performed one or more fraudulent transactions over the Internet. Such information that is communicated by the malicious user may be used by the electronic service provider to enhance its security system to prevent future attacks and/or to protect the user accounts from future losses.

When the proof is communicated in the form of text, the proof may be easily searched, intercepted, and deciphered by the electronic service provider. However, malicious users have become more sophisticated and have started to hide their trails by utilizing image based communication instead. For example, the malicious user may communicate a screenshot of a summary page of an account as proof that the malicious user has successfully taken over the account. Furthermore, the malicious user may obfuscate some of the information presented in the image (e.g., a date, a user name of the account being taken over, etc.), by blurring, scratching, and/or masking one or more portions of the image, to make it difficult for the electronic service provider to decipher and use the communication for its benefit. Thus, there is a need for providing an improved security system that automatically extracts information from such communications by attackers so that the extracted information may be used to provide improved security to the electronic services.

Figure 1:
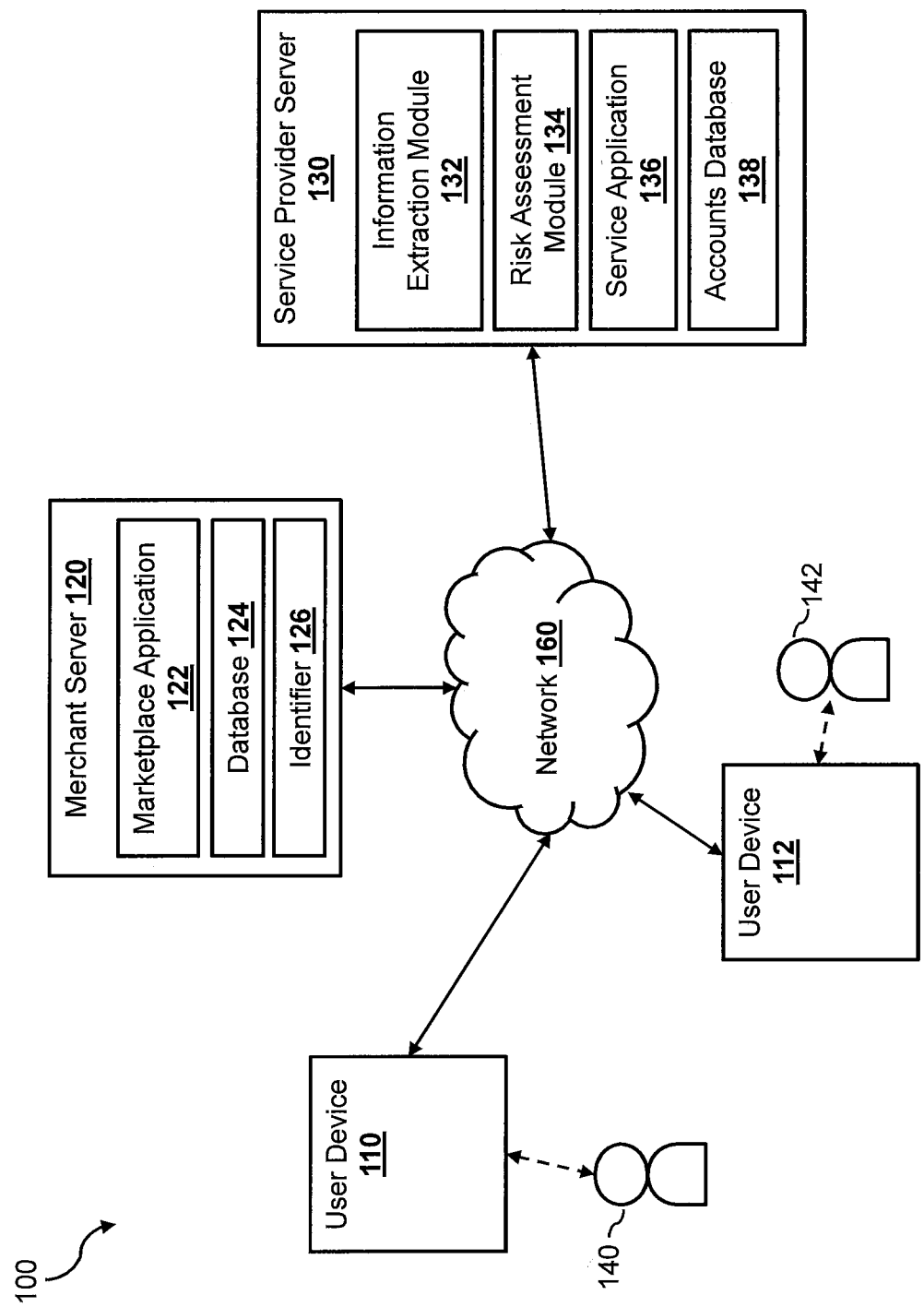
FIG. 1 is a block diagram illustrating an electronic service provider system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for automatically extracting information from images that include one or more obfuscated regions and adjusting a security configuration of an electronic service provider system based on the extracted information. As discussed above, attackers of the electronic service provider system may communicate information related to one or more attacks over the Internet. For example, an attacker (e.g., a malicious user of the electronic service provider system) may post one or more images related to the attacks on the Internet. These images may include a screenshot of a summary page of a user account indicating that the attacker has successfully taken over the user account. In another example, the images may include a screenshot of a transaction history page of a user account indicating that the attacker has successfully completed one or more fraudulent electronic transactions. In order to hide the trails of the attack, the attacker may modify the image by obfuscating one or more regions of the image before posting the modified image on the Internet. In some embodiments, the attacker may use one or more data obfuscation algorithms (e.g., a data blurring algorithm, a data scratching algorithm, and a data masking algorithm) to obfuscate the one or more regions of the image.

When a data blurring algorithm is applied to a region of the image, the region becomes blurry, and the granularity of details present in the region may be reduced and/or completely lost. When a data scratching algorithm is applied to a region of the image, one or more lines are added to the region to cover the underlying information in the region of the image. When a data masking algorithm is applied to a region of the image, a color (e.g., a pixel value representing the color such as the color black) is added to the pixels in the region of the image to cover the underlying information in the region.

The data in the obfuscated regions (also referred to as the "obfuscated data") may represent information that is useful for identification purposes so that improvements in the security of the electronic services provider system may be properly made. For example, for an image that includes a screenshot of a summary page of a user account, the obfuscated data may include at least a portion of an account identifier (e.g., a user name, an account number, etc.) associated with the user account. In another example, for an image that includes a screenshot of a transaction history page of a user account indicating one or more fraudulent transactions, the obfuscated data may include a date of one of the fraudulent transactions, an identifier of an account associated with one of the fraudulent transactions, an amount associated with one of the fraudulent transactions, a merchant involved in the fraudulent transaction, a location of the fraudulent transaction, etc. The obfuscated data and other information extracted from the image may be used by the electronic service provider system to improve the security of the system, such that subsequent attacks on the electronic service provider system may be prevented.

For example, the obfuscated data and the other information may be used to identify a user account that has been taken over by an unauthorized user. The electronic service provider system may then adjust the security level of the user account, for example, by increasing authentication requirements for accessing the user account and/or locking the user account for a predetermined amount of time. The obfuscated data and the other information may also be used to identify the malicious user account of the attacker. The electronic service provider system may then adjust the security level of the malicious user account, for example, by locking the malicious user account for a predetermined amount of time and/or implement usage limitations (e.g., the number of transactions per day, an amount in each transaction, etc.) for the malicious user account. Furthermore, the obfuscated data and the other information may also be used to derive a computing environment (e.g., a device type of the computing device used by the attacker, an operating system of the computing device used by the attacker, an address of the computing device used by the attacker, etc.) in which the attacker performed the attack based on information extracted from the image. The electronic service provider system may then adjust the security parameters of a risk assessment module based on the derived information.

As such, according to various embodiments of the disclosure, an information extraction engine may obtain images related to one or more attacks of the electronic service provider system, extract information from the images, and adjust one or more security configurations of the electronic service provider system based on the extracted information. In some embodiments, the information extraction engine may crawl the web (e.g., using a web crawler) to retrieve images related to the one or more attacks. In one example, it may be known that attackers of electronic services such as hackers often post proof of their attacks (e.g., the images related to the attacks) on one or more specific websites and/or online forums. As such, the information extraction engine may search servers (e.g., web servers) associated with those types of websites (e.g., social media websites, etc.) and online forums to retrieve images posted by users of the corresponding websites and online forums.

Upon retrieving an image, the information extraction engine may process the image to extract information related to an attack. As discussed above, the image may include multiple obfuscated portions, where different portions of the image may be obfuscated using different obfuscation techniques. For example, for an image that includes a screenshot of a transaction history page, a region that includes the date of a transaction may be blurred, and another region that includes an account identifier associated with the transaction may be masked. As such, the information extraction engine may segment the image into multiple image segments and process the image segments independently. Each image segment may correspond to a distinct portion of the image. In some embodiments, the information extraction engine may segment the image based on delimiters identified within the image. For example, the information extraction engine may analyze the image to identify delimiters that define boundaries of the regions within the image. Example delimiters may include white space, a pattern of lines that form one or more regular shapes (e.g., rectangular border lines), special characters such as comma (","), a vertical line ("|"), one or more space characters (" "), an asterisk ("*"), etc. As such, the information extraction engine may use the identified delimiters as region boundaries to segment the image into multiple image segments.

The information extraction engine may then derive a context for the image based on unobfuscated data included in the image and metadata of the image. In this regard, the information extraction engine may analyze each image segment to determine whether the image segment includes unobfuscated data. In some embodiments, the information extraction engine may use an object recognition algorithm and/or an optical character recognition algorithm (OCR) to determine objects and/or text included in the image segment. For example, by applying an object recognition algorithm on the image segments, the information extraction engine may determine that a first image segment of the image includes a logo corresponding to the electronic service provider system. Furthermore, by applying an optical character recognition algorithm to the image segments, the information extraction engine may determine that a second image segment of the image includes a date (e.g., "Jul. 18, 2018"), a third image segment of the image includes a monetary amount in U.S. dollars (e.g., "$10.00 USD"), and a fourth image segment of the image includes a copyright notice of a website of the electronic service provider (e.g., "© 1999-2018 PayPal, Inc.").

Based on the unobfuscated data and the relative positions of the unobfuscated data in the image, the information extraction engine may determine a particular layout corresponding to the image. For example, the information extraction engine may determine that the image includes a logo of the electronic service provider located in the top left corner, a copyright notice of the electronic service provider located at the bottom, and a monetary amount located at a particular position with respect to the logo and the copyright notice. In some embodiments, the information extraction engine may determine that the particular layout determined for the image corresponds to a layout of a particular webpage (e.g., a transaction history page, an account summary page) of the electronic service provider system. For example, based on the particular layout determined for the image, the information extraction engine may derive a context indicating that the image includes a screenshot of a transaction history webpage of the electronic service provider system and that the attack is related to one or more transactions conducted with the electronic service provider system.

Furthermore, the information extraction engine may use at least some of the unobfuscated data extracted from the image to add to the context. For example, the information extraction engine may determine that at least one transaction is indicated in the transaction history webpage, based on the layout, the date, and the monetary amount that is included in the image. While an identifier of a user account was not extracted from the image using either the object recognition algorithm or the text recognition algorithm, the information extraction engine may determine, based on the unobfuscated (or partially obfuscated) data extracted from the image, that the transaction occurred on Jul. 18, 2018 in the amount of USD $10. The transaction information may be added to the context of the image.

In addition to using the unobfuscated data extracted from the image to derive the context, the information extraction engine may further derive the context based on the metadata of the image. In some embodiments, the metadata of the image may indicate information related to the image. For example, the metadata may indicate an operating system of the device that was used to capture the screenshot, an image processing application that was used to edit the image (e.g., to obfuscate one or more regions of the image), an address (e.g., an Internet Protocol (IP) address) of the computing device used to capture the screenshot and/or edit the image, etc. The information extraction engine may add the information extracted from the metadata to the context.

The information extraction engine may then determine whether any image segment in the image includes obfuscated data. As discussed above, data within a region of the image may be obfuscated using one of the data obfuscation algorithms, such as a data blurring algorithm, a data scratching algorithm, a data masking algorithm, etc. A region within the image that has been obfuscated by any one of the data obfuscation algorithms may exhibit certain characteristics unique to the data obfuscation algorithm used to obfuscate the data. As such, the information extraction engine may analyze pixel data in each image segment to determine whether the image segment exhibits characteristics corresponding to one or more of the data obfuscation algorithms. For example, the information extraction engine may determine that at least a portion of a fifth image segment in the image includes obfuscated data based on determining that the fifth image segment exhibits characteristics corresponding to a data masking algorithm.

In addition to or instead of analyzing the pixel data of each image, the information extraction engine may use the context derived for the image to determine whether an image segment includes obfuscated data. Using the example discussed above, the information extraction engine may determine, based on the positions of the second segment that includes a date of the transaction and the third segment that includes an amount of the transaction, and the layout of the transaction history webpage of the electronic service provider system, that a fifth image segment in the image should include an e-mail address associated with a user account based on the position of the fifth image segment with respect to the first, second, third, and fourth segments in the image. When the information extraction engine is unable to extract an email address (or a complete email address) in the fifth image segment, the information extraction engine may determine that the fifth image segment includes obfuscated data.

Upon determining that an image segment within the image includes obfuscated data, the information extraction engine may determine which one of the data obfuscation algorithms was used to generate the obfuscated data. In some embodiments, the information extraction engine may analyze the pixel data within the image segment to determine whether the pixel data within the image segment exhibits characteristics corresponding to one of the data obfuscation algorithms. For example, the information extraction engine may determine that at least a portion of a fifth image segment in the image includes obfuscated data based on determining that the fifth image segment exhibits characteristics corresponding to a data masking algorithm. In some embodiments, the information extraction engine may also use the context derived for the image to determine the data obfuscation algorithm used to generate the obfuscated data. For example, when the context indicates that the image was edited using a particular image processing application, the information extraction engine may determine that one or more of the data obfuscation algorithms are available or not available in the particular image processing application. The information extraction engine may use this additional information to determine a specific data obfuscation algorithm used to generate the obfuscated data when analyzing the pixel data of the image segment.

Once the information extraction engine has determined a particular data obfuscation algorithm that was used to generate the obfuscated data in the image segment, the information extraction engine may select, from multiple data restoration algorithms, a particular data restoration algorithm that corresponds to the particular data obfuscation algorithm for restoring the obfuscated data. The information extraction engine may then apply the selected data restoration algorithm to the pixel data of the image segment to restore the obfuscated data to generate restored data. For example, the information extraction engine may select a particular data restoration algorithm that corresponds to the data masking algorithm that was used to generate the obfuscated data in the fifth image segment. The information extraction engine may then apply the particular data restoration algorithm to the pixel data in the fifth image segment to restore the obfuscated data in the fifth image segment.

Due to the amount of detail loss from the obfuscation, the information extraction engine may not be able to restore the obfuscated data based solely on the pixel data within the image segment and the data restoration algorithm. In some embodiments, the information extraction engine may use information from the context of the image to aid the data restoration algorithm in restoring the obfuscated data. For example, as discussed above, based on the context of the image, the information extraction engine may determine that the obfuscated data in the fifth image segment may include an email address. As such, the information extraction engine may determine certain characteristics associated with the obfuscated data. For example, the information extraction engine may determine that the obfuscated data includes one or more special characters such as the "@" character and a period "." toward the end of the fifth image segment. Furthermore, since the information extraction engine has identified that the image includes a screenshot of a transaction history page of the electronic service provider system, the information extraction engine may determine a particular appearance of the obfuscated data, such as a font type, a font size, a font color, etc. This additional information may be provided to the data restoration algorithm, which may aid in restoring the obfuscated data in the image segment. In this example, the information extraction engine may obtain the restored data that corresponds to an e-mail address (e.g., "john_doe@pypl.com") from the fifth image segment.

In some embodiments, when more than one data obfuscation algorithm is used to obfuscate the data (e.g., applying a first data obfuscation algorithm to the data to generate first obfuscated data and then applying a second data obfuscation algorithm to the first obfuscated data to generate second obfuscated data), the image segment may be analyzed and data within the image segment may be restored iteratively until the actual data from the image is generated. For example, after applying a first data restoration algorithm to the fifth image segment to generate first restored data, the first restored data is analyzed again to determine a second data restoration algorithm. The second data restoration algorithm may then be applied to the first restored data to generate second restored data. The analysis and restoration process may be repeated until actual interpretable data is generated.

When it is determined that more than one image segment includes obfuscated data, the information extraction engine may restore the obfuscated data in the other image segment(s) in a similar manner as discussed herein. For example, for each image segment that includes obfuscated data, the information extraction engine may determine a particular data obfuscation algorithm that was used to generate the obfuscated data in the image segment, select a particular data restoration algorithm that corresponds to the particular data obfuscation algorithm, and restore the obfuscated data in the image segment by applying the selected data restoration algorithm to pixel data in the image segment. As such, the information extraction engine may advantageously apply different data restoration algorithms to different image segments based on which data obfuscation algorithms were used in those image segments.

The information extraction engine may then update the context based on the restored data extracted from the image segment(s). For example, the information extraction engine may update the context for the image by adding that the transaction indicated in the transaction history page occurred on Jul. 18, 2018 in the amount of USD $10 involves a user account identified by the e-mail "john_doe@pypl.com".

In some embodiments where the metadata of the image does not include information related to the computing environment in which the image was captured or edited, the information extraction engine may also derive the computing environment information based on the data obfuscation algorithm used to generate the obfuscated data in the image. For example, the information extraction engine may determine that the particular data masking algorithm used to generate the obfuscated data is implemented by a particular mobile application for the iOS operating system. As such, the information extraction engine may update the context to indicate that the image was likely captured/edited using the particular mobile application running on the iOS operating system.

Based on updated context, the information extraction engine may adjust one or more security parameters for the electronic service provider system. For example, the information extraction engine may adjust the authentication requirement for accessing the user account "john_doe@pypl.com" or lock the user account "john_doe@pypl.com". The information extraction engine may also adjust the security parameters of the electronic service provider system such that the electronic service provider may increase the risk level of transaction requests generated from devices running the iOS operating system. Thus, using the techniques disclosed herein, the electronic service provider system may improve its security configurations by extracting security-related information from images retrieved on the Internet, and adjusting the security configurations of the electronic service provider system based on the extracted information.

FIG. 1 illustrates an electronic service provider system 100 within which the information extraction engine may be implemented according to one embodiment of the disclosure. The electronic service provider system 100 includes a service provider server 130, a merchant server 120, and user devices 110 and 112 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user devices 110 and 112, in one embodiment, may be utilized by users 140 and 142, respectively, to interact with the merchant server 120 and/or the service provider server 130 over the network 160. For example, the users 140 and 142 may use the user devices 110 and 112 to log in to the respective user accounts to conduct electronic transactions (e.g., electronic payment transactions, online purchase transactions, etc.) with the service provider server 130. Similarly, a merchant associated with the merchant server 120 may use the merchant server 120 to log in to a merchant account to conduct electronic transactions (e.g., electronic payment transactions) with the service provider server 130. Each of the user devices 110 and 112, in various embodiments, may be implemented using any appropriate combination of hardware and/or software configured for wired and/or wireless communication over the network 160. In various implementations, each of the user devices 110 and 112 may include at least one of a wireless cellular phone, wearable computing device, PC, laptop, etc.

Each of the user devices 110 and 112, in one embodiment, includes a user interface (UI) application (e.g., a web browser), which may be utilized by the users 140 and 142 to conduct electronic transactions (e.g., log-in, perform electronic payments, etc.) with the service provider server 130 over the network 160. In one aspect, purchase expenses may be directly and/or automatically debited from an account related to the user 140 via the user interface application.

In one implementation, the user interface application includes a software program, such as a graphical user interface (GUI), executable by a processor that is configured to interface and communicate with the service provider server 130 via the network 160. In another implementation, the user interface application includes a browser module that provides a network interface to browse information available over the network 160. For example, the user interface application may be implemented, in part, as a web browser to view information available over the network 160.

Each of the user devices 110 and 112, in one embodiment, may include at least one identifier, which may be implemented, for example, as operating system registry entries, cookies associated with the user interface application, identifiers associated with hardware of the user device (e.g., a media control access (MAC) address), or various other appropriate identifiers. In various implementations, the users 140 and 142 are able to input data and information into an input component (e.g., a keyboard) of the respective user devices 110 and 112 to provide user information with a transaction request, such as a login request, a request to view transaction history associated with a user account, a request to view a summary of a user account, an electronic fund transfer request, a request for adding a new user account, a request for adding an additional funding source (e.g., a new credit card), or other types of request. The user information may include user identification information.

Each of the user devices 110 and 112, in various embodiments, includes a location component configured to determine, track, monitor, and/or provide an instant geographical location of the user device. In one implementation, the geographical location may include GPS coordinates, zip-code information, area-code information, street address information, and/or various other generally known types of location information. In one example, the location information may be automatically obtained and/or provided by the user device via an internal or external monitoring component that utilizes a global positioning system (GPS), which uses satellite-based positioning, and/or assisted GPS (A-GPS), which uses cell tower information to improve reliability and accuracy of GPS-based positioning.

Even though only two user devices 110 and 112 are shown in FIG. 1, it has been contemplated that more than two user devices (each similar to the user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites (e.g., e-commerce websites, etc.), resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface applications of the user devices 110 and 112. For example, the users 140 and 142 of the user devices 110 and 112 may interact with the marketplace application 122 through the user interface application over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100. Note that while a "merchant server" has been described above, this specification is not limited to such servers. Other types of computing devices (e.g. systems not necessarily corresponding to a merchant) are contemplated in place of merchant server 120 in various embodiments.

The service provider server 130, in one embodiment, may be maintained by a transaction processing entity or an online service provider, which may provide processing for electronic transactions between the user 140, the user 142, and one or more merchants. As such, the service provider server 130 may include a service application 136, which may be adapted to interact with the user devices 110 and 112, and/or the merchant server 120 over the network 160 to facilitate the searching, selection, purchase, payment of items, funds transfer, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service application 136 may include a web server that is configured to serve web content to users in response to HTTP requests. As such, the web server may include pre-generated web content ready to be served to users. For example, the web server may store a log-in page, and is configured to serve the log-in page to users for logging into user accounts of the users to access various electronic service provided by the service provider server 130. The web server may also include other webpages associated with the different account services offered by the service provider server 130. For example, the web server may serve an account summary page that provides a summary of information associated with a particular user account. The web server may also serve a transaction history page that provides a list of transactions conducted by a particular user account. As a result, a user may access a user account (and information of the user account) and access various services offered by the service provider server 130, by generating HTTP requests directed at the service provider server 130.

The service provider server 130, in one embodiment, may be configured to maintain one or more user accounts and merchant accounts in an account database 138, each of which may include account information associated with one or more individual users (e.g., the user 140 associated with user device 110, the user 142 associated with the user device 112, etc.) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the risk assessment module 134 to determine whether to authorize or deny a request associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

In various embodiments, the service provider server includes the risk assessment module 134 that is configured to determine whether to authorize or deny an incoming request from the user device 110, the user device 112, or the merchant server 120. The request may be a log-in request, a fund transfer request, a request for adding an additional funding source, or other types of electronic transaction requests associated with the variety of services offered by the service provider server 130. As such, when a new request is received at the service provider server 130, the risk assessment module 134 may request data associated with a particular user account (e.g., a risk score, previous transaction data, previous login attempts, etc.) from the accounts database 136. The risk assessment module 134 may then analyze (or evaluate) the request in view of the data retrieved from the accounts database 136 and the data provided by the information extraction module 132, and may determine whether the request is possibly an unauthorized/fraudulent request. The risk assessment module 134 may transmit an indication of whether the request is possibly an unauthorized/fraudulent request to the service application 136 such that the service application 136 may process (e.g., approve or deny) the request based on the indication.

The service provider server 130 also includes an information extraction module 132 configured to extract information related to one or more attacks on the service provider server 130. In one embodiment, the information extraction module 132 may implement the information extraction engine as discussed above. As such, the information extraction module 132 may retrieve images related to one or more attacks on the service provider server 130, may extract information from the retrieved images, and adjust one or more security parameters of the service provider server 130 (e.g., configure the risk assessment module 134) based on the extracted information such that the risk assessment module 134 may assess a risk of incoming transaction requests more accurately.

Figure 2:
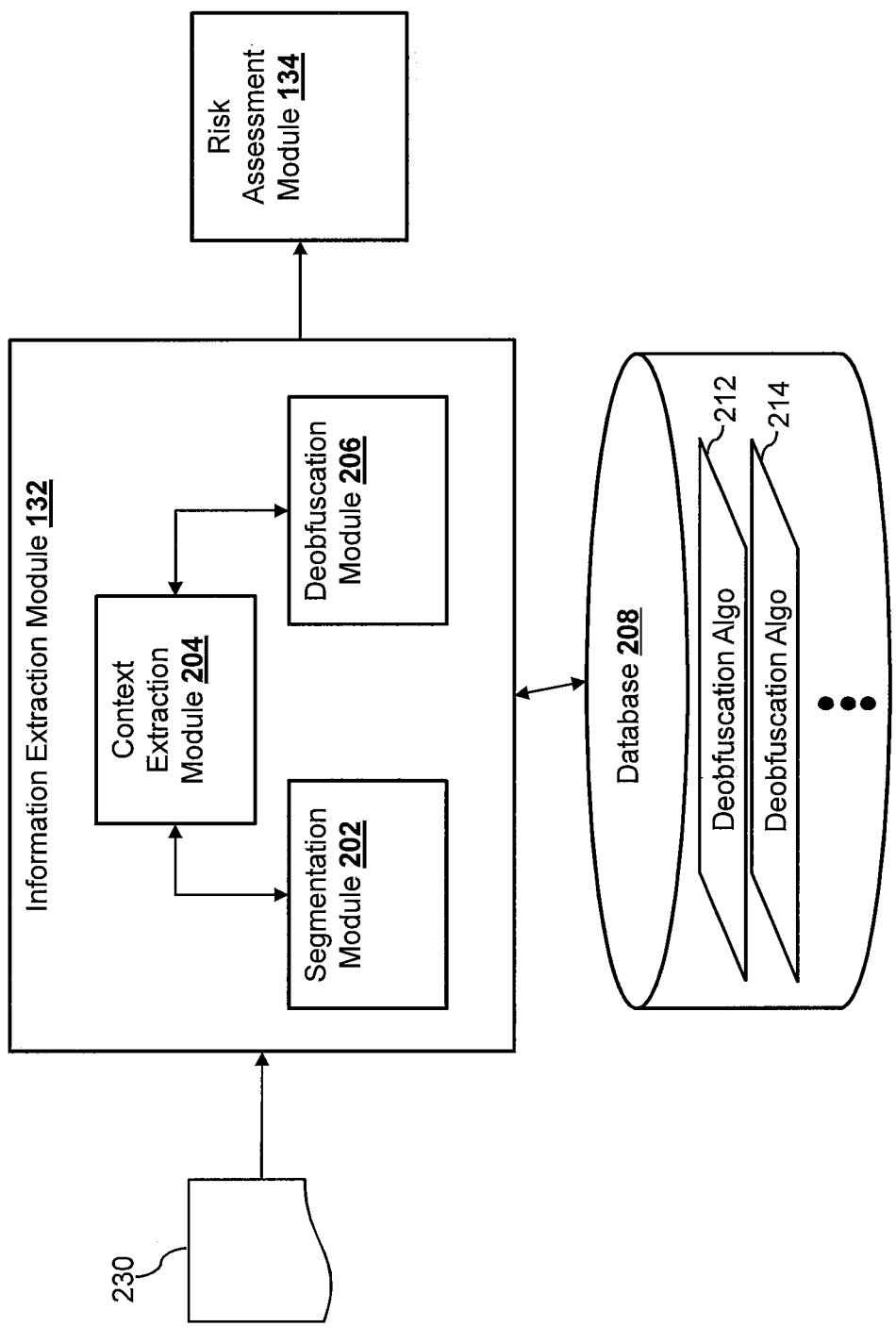
FIG. 2 is a block diagram illustrating an information extraction module according to an embodiment of the present disclosure.

FIG. 2 illustrates a block diagram of the information extraction module 132 according to one embodiment of the disclosure. The information extraction module 132 includes a segmentation module 202 configured to segment an image, such as an image 230, into multiple image segments. The information extraction module 132 also includes a context extraction module 204 to derive a context for the image 230 using techniques disclosed herein. For example, the context extraction module 204 may derive a context for the image 230 based on the unobfuscated data included in the image 230, the obfuscated data included in the image 230, and/or the metadata of the image 230. The information extraction module 132 also includes a deobfuscation module 206 configured to restore obfuscated data included in one or more image segments of the image 230. In some embodiments, the deobfuscation module 206 may use the context derived by the context extraction module 204 to select one of the various deobfuscation algorithms (e.g., deobfuscation algorithm 212, deobfuscation algorithm 214, etc.) stored in a database (e.g., database 208) for restoring the obfuscated data. Furthermore, the deobfuscation module 206 of some embodiments may also utilize the context derived by the context extraction module 204 in restoring the obfuscated data. Once the obfuscated data is restored, the context extraction module 204 may modify and/or update the context based on the restored data. The information extraction module 132 may then re-configure the risk assessment module 134 based on the context derived for the image 230 to change one or more security parameters of the service provider server 130.

Figure 3:
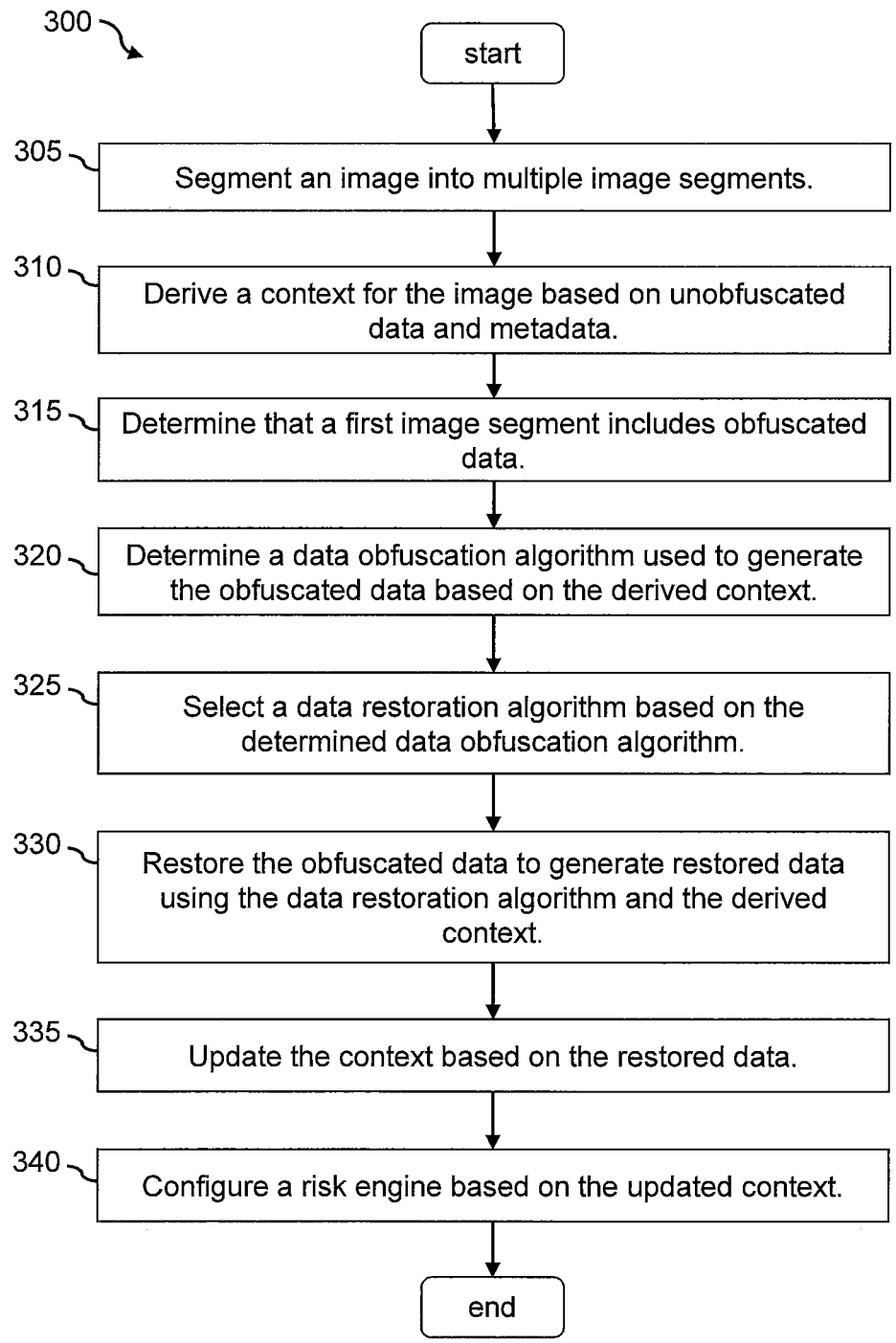
FIG. 3 is a flowchart showing a process of extracting information from an image including obfuscated data according to an embodiment of the present disclosure.

FIG. 3 illustrates a process 300 for extracting information from an image according to one embodiment of the disclosure. In some embodiments, the process 300 may be performed by the information extraction module 132. The process 300 begins by segmenting (at step 305) an image into multiple image segments. As discussed above, the information extraction module 132 may search the web from time to time (e.g., randomly, at time intervals of different durations, periodically such as every day, every five hours, etc.) to retrieve images that may be related to one or more attacks on the service provider server 130. For example, an attacker who launched a successful attack (e.g., account takeover, fraudulent transaction, etc.) on the service provider server 130 may capture and then post on the web an image as a proof of his/her successful attack. The image may include a screenshot of an account summary page associated with an account with the service provider server 130 that has been fraudulently taken over by the attacker or a screenshot of a transaction history page of the service provider server 130 indicating a transaction that the attacker has fraudulently conducted. The attacker may obfuscate some of the information in the image (e.g., an email address, a date of the transaction, etc.) to avoid leaving clues that may lead to an identity of the attacker. For example, the attacker may use one or more image editing applications to blur, scratch, or mask one or more portions of the image to obfuscate the underlying data such that the underlying data would not be accessible by viewers of the image. The attacker may then post the edited image on the Internet, for example, in an online forum where attackers share their stories and tout their successes.

Figure 4:
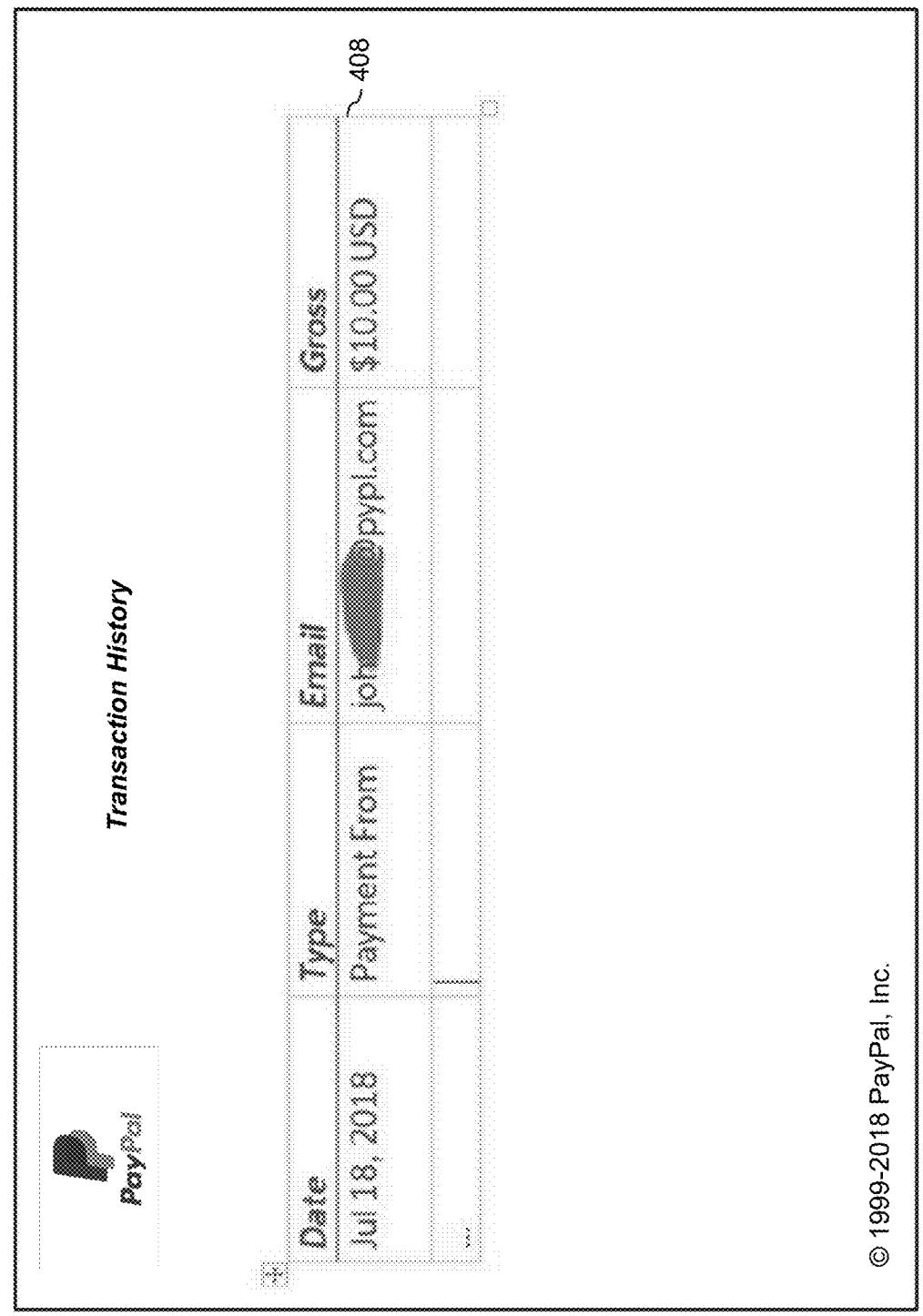
FIG. 4 illustrates an exemplary image that includes obfuscated data according to an embodiment of the present disclosure.

FIG. 4 illustrates an example image 400 posted by an attacker and obtained by the information extraction module 132. In this example, the image 400 includes a screenshot of a transaction history page that indicates a summary of transactions including a transaction 408. As shown, the transaction history page displays a date, a type, an email address, and an amount related to each transaction. However, for the transaction 408, a portion of the data that corresponds to the email field has been obfuscated (e.g., masked out) such that a viewer of the image 400 is unable to see the entire email address related to the transaction 408. While only one portion of the image 400 is shown to be obfuscated in this example, multiple portions of the image 400 may be obfuscated. For example, in addition to the email address, the portion of the e-mail that displays the date of the transaction 408 may also be obfuscated. Furthermore, the attacker may use different data obfuscation algorithms for obfuscating different portions of the image 400. In one example, the attacker may mask out (e.g., applying a data masking algorithm on) a first portion of the image 400 and may blur out (e.g., applying a data blurring algorithm on) a second portion of the image 400.

As such, once the image (e.g., the image 400) is obtained by the information extraction module 132, the segmentation module 202 may segment the image 400 into multiple image segments such that the image segments may be processed by the information extraction module 132 independent from each other. Each image segment may correspond to a distinct portion of the image 400. In some embodiments, the segmentation module 202 may segment the image based on delimiters identified within the image. For example, the information extraction engine may analyze the image to identify delimiters that define boundaries of the different regions within the image. Example delimiters may include empty space (e.g., rectangular borders of white space), a patterns of lines that form one or more regular shapes (e.g., rectangular border lines), special characters such as comma (","), a vertical line ("|"), one or more space characters (" "), an asterisk ("*"), etc. As such, the information extraction engine may use the identified delimiters as region boundary to segment the image into multiple image segments.

Figure 5:
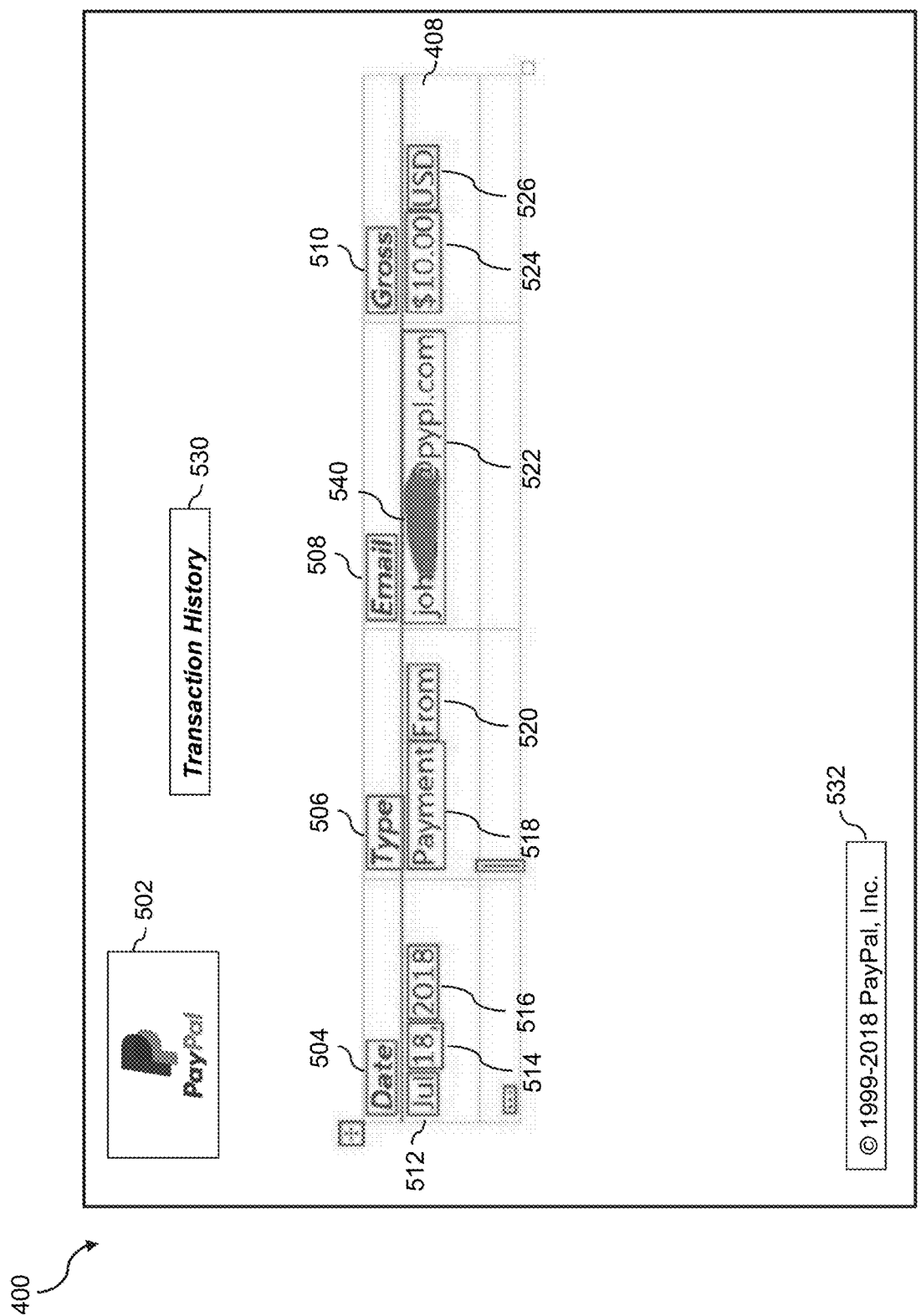
FIG. 5 illustrates segmentation of an image according to an embodiment of the present disclosure.

FIG. 5 illustrates segments that are identified in the image 400. In this example, the segmentation module 202 may identify an image segment 502 that includes a logo based on the delimiter (e.g., white space) that separates the logo from the page title "Transaction History" and the listing of the transactions, an image segment 530 that includes the page title "Transaction History" based on the delimiter (e.g., white space) that separates the page title from the logo and the listing of the transactions, and an image segment 532 that includes a copyright notice based on the delimiter (e.g., white space) that separates the copyright notice from the listing of the transactions. The segmentation module 202 may also identify image segments 504-526 that include the content of the listing of the transactions. In some embodiments, the segmentation module 202 segments the portion of the image 400 that includes the listing of the transactions into the image segments 504-526 based on the rectangular borders that define the boundaries of each cells in the table and/or one or more character delimiters such as the comma (",") or space (" "). By segmenting the image 400 into the multiple image segments 502-532, the information extraction module 132 may analyze each of the image segments 502-532 independently to extract corresponding information from the image segments 502-532. This way, the information extraction module 132 may apply different image processing techniques (e.g., different data restoration algorithms) on different image segments.

The process 300 then derives (at step 310) a context for the image based on unobfuscated data included in the image and the metadata of the image. For example, the context extraction module 204 may analyze each of the image segments 502-532 to extract unobfuscated data from the image segments 502-532. In some embodiments, the context extraction module 204 may use an object recognition algorithm and/or an optical character recognition algorithm to extract unobfuscated data from the image segment 502-532. For example, by using an object recognition algorithm on the image segment 502, the context extraction module 204 may determine that the image segment 502 includes a logo associated with the service provider server 130. By using an optical character recognition algorithm on the image segment 530, the context extraction module 204 may determine that the image segment 530 includes the words "Transaction History." Similarly, by using an optical character recognition algorithm on the image segment 530, the context extraction module 204 may determine that the image segment 530 includes a copyright notice associated with the service provider server 130.

By using an optical character recognition algorithm on the image segments 504-526, the context extraction module 204 may determine that the image segments 504-526 include information related to a completed transaction, including a date ("Jul. 18, 2018") extracted from the image segments 512-516, a transaction type ("Payment From") extracted from the image segments 518-520, an incomplete email address ("joh . . . pypl.com") extracted from the image segment 522, and an amount ("$10.00 USD) extracted from the image segments 524-526.

In addition to extracting the unobfuscated data in the image 400, the context extraction module 204 may also determine a layout corresponding to the image 400 to derive additional context for the image 400. For example, the context extraction module 204 may determine that the logo of the service provider server 130 is located at the top left corner of the image 400, the words "Transaction History" is located approximately in the top middle position of the image 400, the copyright notice of the service provider server 130 is located in the bottom left of the image 400, and the transaction data 408 located in the middle of the page between the logo and the copyright notice. The context extraction module 204 may then determine the layout for the image 400 based on the relative positions of the various elements extracted from the image 400 (e.g., the logo, the words "Transaction History", the transaction data, and the copyright notice). In some embodiments, the context extraction module 204 may compare the layout determined for the image 400 against one or more known layouts of various webpages (e.g., an account summary page, a transaction history page, a transaction detail page, a login page, etc.) associated with the service provider server 130. In this example, the context extraction module 240 may determine that the layout determined for the image 400 matches a known layout corresponding to a transaction history page of the service provider server 130. For example, the context extraction module 240 may determine that the layout determined for the image 400 matches a known layout corresponding to a transaction history page of the service provider server 130 by determining that the layout determined for the image 400 share common elements with the known layout by over a predetermined threshold (e.g., 80%, 90%, etc.). Based on the determination that the image 400 corresponds to a transaction history page of the service provider server 130, the context extraction module 204 may further determine that the image 400 illustrates a transaction history page that includes the transaction 408. Furthermore, the transaction 408 is a payment transfer transaction of a payment in the amount of U.S. $10.00 occurred on Jul. 18, 2018 from an unknown account (having an incomplete email address ("joh . . . pypl.com"). The context extraction module 204 may then add to the additional information to the context that the image 400.

In some embodiments, the context extraction module 204 may also update the context based on metadata extracted from the image 400. As discussed above, the metadata of an image may indicate additional information associated with the image, such as a date when the image was captured, a computing environment in which the image is captured (e.g., a device/program (including the operating system and application) used to capture the image, a device/program (including the operating system and application) used to edit the image, an address of the device, such as an Internet Protocol (IP) address, that captured and/or edited the image, etc.), and/or other information related to the image. For example, the context extraction module 204 may determine that the metadata of the image 400 indicates that the image 400 was edited on an iPhone® using a particular photo editing software. The context extraction module 204 may also add the addition information extracted from the metadata of the image 400 to the context.

Referring back to FIG. 3, the process 300 then determines (at step 315) whether any image segment in the image includes obfuscated data and determines (at step 320) a data obfuscation algorithm used to generate the obfuscated data within the image segment. For example, the information extraction module 132 may analyze each of the image segments 502-532 in the image 400 to determine whether any one of the image segments 502-532 includes obfuscated data. As discussed above, data within one or more regions of an image may be obfuscated using one of the data obfuscation algorithms, such as a data blurring algorithm, a data scratching algorithm, a data masking algorithm, etc. An image region that has been obfuscated by any one of the data obfuscation algorithms may exhibit certain characteristics unique to the data obfuscation algorithm used. For example, an image region that has been obfuscated (e.g., blurred) by a data blurring algorithm may exhibit characteristics such as having a number of edges detected in the region below an edge threshold and/or having a variance among pixel data within the region within a threshold range of variance (e.g., relatively low variance). An image region that has been obfuscated (e.g., masked) by a data masking algorithm may exhibit characteristics such as having a group of adjacent pixels (e.g., a block of pixels) having a variance below a threshold variance (e.g., close to zero or at zero).

As such, the information extraction module 132 may analyze pixel data in each of the image segments 502-532 to determine whether the image segment exhibits the characteristics corresponding to one of the data obfuscation algorithms. For example, by analyzing the pixel data within the image segment 522, the information extraction module 132 may determine that a group of adjacent pixels 540 have variance below the threshold variance, indicating that the group of adjacent pixels 540 has substantially identical pixel values. Since this characteristic corresponds to data being obfuscated using a data masking algorithm, the information extraction module 132 may determine that the image segment 522 includes obfuscated data that is generated by using a data masking algorithm.

Instead of or in addition to analyzing pixel data within each of the image segments 502-532, the information extraction module 132 of some embodiments may determine that an image segment includes obfuscation data based on the context that is derived for the image. For example, the information extraction module 132 may use the layout determined for the image 400 to determine whether any one of the image segments 502-522 includes obfuscated data. In this example, based on the context derived for the image 400, the information extraction module 132 may determine that the image 400 includes a screenshot of a transaction history page that includes a transaction 408. The information extraction module 132 may further determine, based on the known layout of a transaction history page and the unobfuscated data (and their positions in the image 400) extracted from the image 400, that the image segment 522 should include an email address corresponding to the transaction 408. However, since only an incomplete (a partial) e-mail address was extracted from the image segment 522 using the optical character recognition algorithm, the information extraction module 132 may determine that the image segment 522 includes obfuscated data.

Once it is determined that the image segment 522 includes obfuscated data, the information extraction module 132 of some embodiments may use the context derived for the image 400 to determine which one of the data obfuscated algorithms was used to generate the obfuscated data in the image segment 522. For example, since the context derived for the image 400 indicate that the image 400 was edited with an iPhone® using the particular software editing software, the information extraction module 132 may determine that the particular software editing software that runs on an iOS operating system may include a data masking tool, but not any other data obfuscation tool. As such, the information extraction module 132 may determine that the obfuscated data in the image segment 522 was generated using the data masking tool that is associated with the particular image editing software.

In some embodiments, when the metadata of the image 400 lacks information indicating the computing environment in which the image 400 was captured and/or edited, the information extraction module 132 may use the information regarding the particular data obfuscation algorithm that was used to generate the obfuscated data in the image 400 (and/or the color palette of the image, a clarity of the image, a resolution of the image, etc.) to predict the computing environment in which the image 400 was captured and/or edited. For example, when the information extraction module 132 determines that the obfuscated data included in the image segment 522 was generated by the particular data masking algorithm based on analyzing the pixel data within the image segment 522, the information extraction module 132 may predict that the image 400 was edited using the particular image editing software running on an iOS operating system based on the association between the particular data masking algorithm and the particular image editing software. The information extraction module 132 may then update the context with the information regarding the predicted computing environment.

Figure 6:
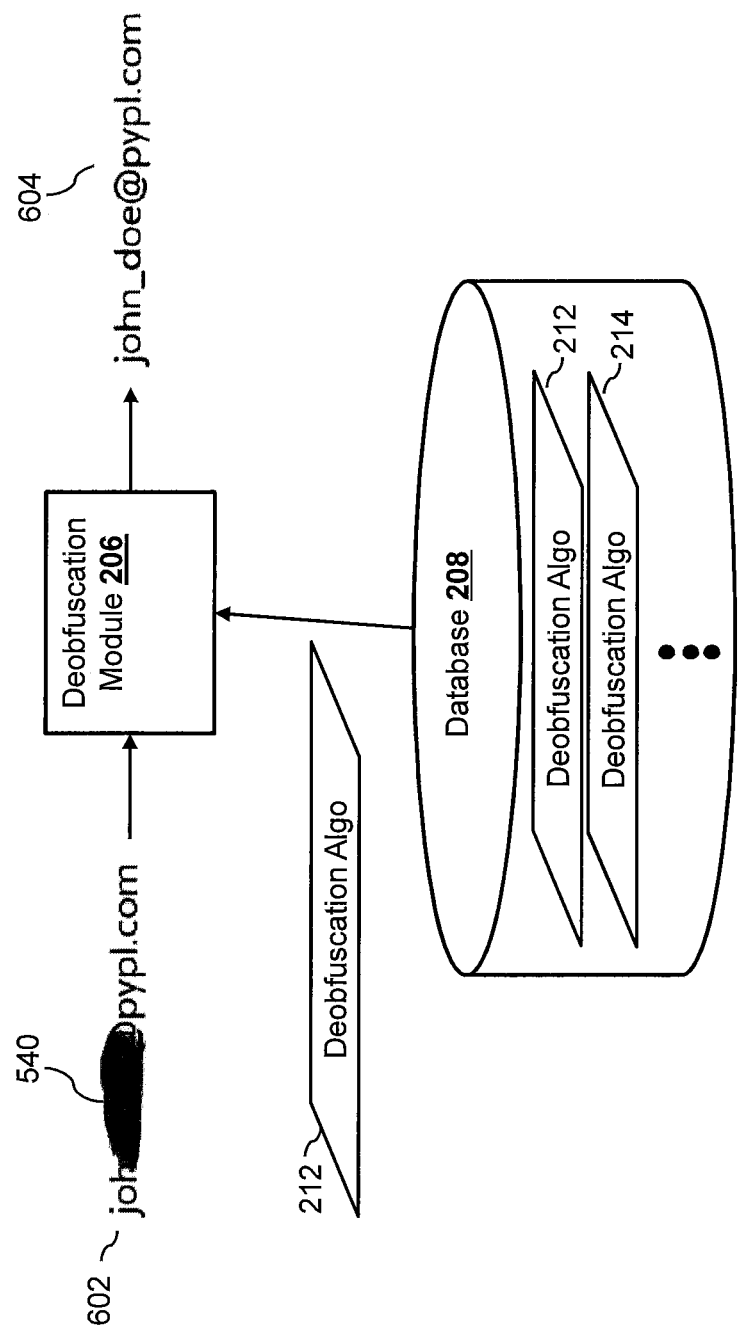
FIG. 6 illustrates restoration of obfuscated data according to an embodiment of the present disclosure.

Once a particular data obfuscation algorithm is determined for an image segment, the process 300 selects, among multiple data restoration algorithms, a particular data restoration algorithm for restoring the obfuscated data. As shown in FIG. 6, the deobfuscation module 206 is coupled to the database 208 that includes multiple data deobfuscation algorithms, including the data deobfuscation algorithm 212 and the data deobfuscation algorithm 214. Each of the data deobfuscation algorithms may be configured to restore obfuscated data that has been obfuscated using a particular data obfuscation algorithm and/or technique. For example, the data deobfucation algorithm 212 may be configured to restore data that has been masked using a data masking algorithm. The data deobfuscation algorithm 214 may be configured to restore data that has been blurred using a data blurring algorithm. Other data deobfuscation algorithms may also be included in the database 208, where each of the data deobfuscation algorithms may be configured to restore data that has been obfuscated using a corresponding data obfuscation algorithm/technique. Based on the particular data obfuscation algorithm determined for the image segment 522, the deobfuscation module 206 may select a particular data deobfuscation algorithm (e.g., the data deobfuscation algorithm 212) that corresponds to the particular data obfuscation algorithm (e.g., the data masking algorithm) for restoring the obfuscated data in the image segment 522.

The process 300 then restores (at step 330) the obfuscated data to generate restored data using the selected data restoration algorithm and the derived context. For example, as shown in FIG. 6, the deobfuscation module 206 may apply the deobfuscation algorithm 212 selected for the image segment 522 on the pixel data 602 in the image segment 522 to generate restored data 604. However, a large amount of details in the data 540 that has been obfuscated may have been lost through the data obfuscation process such that the data restoration algorithm may not be able to restore the obfuscated data 540 based on the pixel data within the image segment 522 alone. For example, consider the portion of the data 540 within the image segment 522 that has been masked, the portion 540 appears to be a patch of color (e.g., a patch of black), which contains very little information regarding the underlying data that has been obfuscated. As such, without additional information (e.g., clues) regarding the underlying data, the deobfuscation module 206 may not be able to completely restore the obfuscated data using the data deobfuscation algorithm 212.

Thus, in some embodiments, the data deobfuscation module 206 may determine additional information (e.g., characteristics) for the obfuscated data 540 based on the context derived for the image 400 to add the data restoration process. For example, based on the context that indicates the image 400 represents a screenshot of a transaction history page of the service provider server 130, the deobfuscation module 206 may determine that the email address in the image segment 522 should be displayed in a particular font size, a particular font type, and/or a particular font color. Furthermore, since the obfuscated data represents an email address, the deobfuscation module 206 may determine that the obfuscated data should have a particular format. For example, an email should have a "@" character that separates a user name and a domain name of the email address, and the domain name portion of the email should include a period ("."). Thus, the deobfuscation module 206 may use the additional information determined from the context to restore the obfuscated data. In some embodiments, the deobfuscation module 206 may use the additional information to configure one or more parameters of the deobfuscation algorithm 212 before applying the deobfuscation algorithm 212 to the pixel data in the image segment 522. In this example, the deobfuscation module 206 may generate the restored data "john_doe@pypl.com" using the deobfuscation algorithm 212 and the context derived for the image 400, as shown in FIG. 6.

In some embodiments, when it is determined that multiple image segments in the image 400 includes obfuscated data, the deobfuscation module 206 may use the same techniques as disclosed herein to restore the obfuscated data in the other image segments that include obfuscated data. By analyzing the restoring data within each image segment independently, the information extraction module 132 may advantageously apply different analyses on the different image segments, such that a specific sub-context may be determined specifically for each of the image segments. Furthermore, since different data obfuscation algorithms may be used to generate the obfuscated data in different image segments, the information extraction module 132 may advantageously select different data deobfuscation algorithms to restore the obfuscated data in the different image segments. For example, while it is determined that the email address in the image segment 522 has been partially masked using a data masking algorithm, data in another image segment of the image 400 may have been obfuscated using a different data obfuscation algorithm (e.g., a data blurring algorithm, a data scratching algorithm, etc.). Thus, the data deobfuscation module 206 may apply the data restoration algorithm 212 corresponding to the data masking algorithm to restore the obfuscated data in the image segment 522, while applying another data restoration algorithm (e.g., the data restoration algorithm 214) to the data in the other image segment.

In addition to selecting different data restoration algorithms for restoring data in the different image segments, based on the different sub-context within the different segments, the data deobfuscation module 206 may configure the data restoration algorithms differently based on the sub-context for the corresponding image segments. For example, since it is determined that the obfuscated data within the image segment 522 should include an email address having a first font type, a first font size, and a first font color (which is a first sub-context for the image segment 522), the data deobfuscation module 206 may configure the data deobfuscation algorithm 212 using a first set of parameters based on the first sub-context. On the other hand, the information extraction module 132 may determine a second sub-context for the other image segment, which indicates that the obfuscated data in the other image segment corresponds to a second data type, having a second font type, a second font size, and a second font color. Thus, the data deobfuscation module 206 may configure the data deobfuscation algorithm 214 with a second set of parameters based on the second sub-context before applying the data deobfuscation algorithm 214 to restore the obfuscated data in the other image segment.

Once the obfuscated data in the image has been restored, the process 300 updates (at step 335) the context for the image based on the restored data. For example, the information extraction module 132 may update the context for the image 400 based on the restored data generated from the image segment 522. Since the restored data from the image segment 522 includes a complete email address, the information extraction module 132 can update the context by including the email address "john_doe@pypl.com" in the transaction 408. After the update, the context for the image 400 now represents a transaction of a payment transfer from an account associated with the email address "john_doe@pypl.com" in the amount of U.S. $10.00 on Jul. 18, 2018.

The process 300 then configures (at step 340) a risk engine based on the updated context. For example, the information extraction module 132 may configure the risk assessment module 134 of the service provider server 130 using the updated context derived for the image 400. In some embodiments, based on updated context, the information extraction module 132 may adjust one or more security parameters for the risk assessment module 134. For example, the information extraction module 132 may identify one or more user accounts of the service provider server 130 that were affected by the attack corresponding to the image 400 and adjust (e.g., increase) the authentication requirements for accessing the one or more user accounts (e.g., the user account associated with the email "john_doe@pypl.com", etc.) based on the updated context. The information extraction module 132 may even lock the one or more user accounts for a predetermined amount of time (e.g., 5 days, 1 month, etc.). In some embodiments, the information extraction module 132 may also adjust the security parameters of the risk assessment module 134 based on the computing environment determined from the image 400. For example, since it is determined that the image 400 was captured and/or edited in a computing environment that includes an iPhone® running a particular version of iOS operating system, the information extraction module 132 may adjust the security parameters of the risk assessment module 134 such that transaction requests received from devices that match such a computing environment. Thus, by performing the information extraction process as disclosed herein, risk intelligence can be automatically extracted from images that include obfuscated data, and the extracted risk intelligence can be automatically used to adjust the risk assessment module 134 to improve the security of the service provider system 100.

While the examples given above involve extracting information from screenshots of various webpages associated with a user account with a service provider (e.g., the account summary page, the transaction history page, etc.), the technique disclosed herein may also be applied to other examples without departing from the spirit of the disclosure. For example, a cyber-attacker may use an existing crimeware toolkit (e.g., Sentry MBA) to perform the cyber-attacks. In one example, the cyber-attacker may use Sentry MBA to perform credential stuffing to test stolen credentials by automatically connect to a service provider server (e.g., the service provider server 132) using the stolen credentials. After performing the credential stuffing process, the Sentry MBA may provide an interface that displays all of the credentials that the toolkit has tried, and report a status (e.g., success, fail, etc.) of the trials. The cyber-attacker may taut the success by posting a screenshot image of the interface to illustrates how many accounts with the service provider to which the cyber-attacker has successfully gained access. The cyber-attacker may obfuscate some of the data in the screenshot image (e.g., part or all of the user names, part or all of the passwords, etc.) before posting the modified screenshot image on the Internet (e.g., in a cyber-attack forum). As such, the information extraction module 132 may use the techniques disclosed herein to extract information from the screenshot image. In some embodiments, the information extraction module 132 may determine that the screenshot image represents the interface of a particular crimeware toolkit (e.g., Sentry MBA), for example, by recognizing a particular layout, a logo, of the unobfuscated regions of the image. Based on the recognition that the image represents the interface of the particular crimeware toolkit, the information extraction module 132 may determine one or more characteristics (e.g., appearance, etc.) of the obfuscated data (e.g., the obfuscated username, the obfuscated password, etc.), such as a particular font type, a particular font size, a particular font color, which may help the information extraction module to deobfuscate the obfuscated data. The information extraction module 132 may then determine one or more data obfuscation algorithm used to obfuscate the data, may apply one or more corresponding deobfuscation algorithms to restore the obfuscated data, and extract information (e.g., the user names of the accounts that have been accessed illegally) from the image. The information extraction module 132 may then use the extracted information to configure the risk assessment module 134 (e.g., to increase the security for those user accounts, lock those user accounts, etc.).

Figure 7:
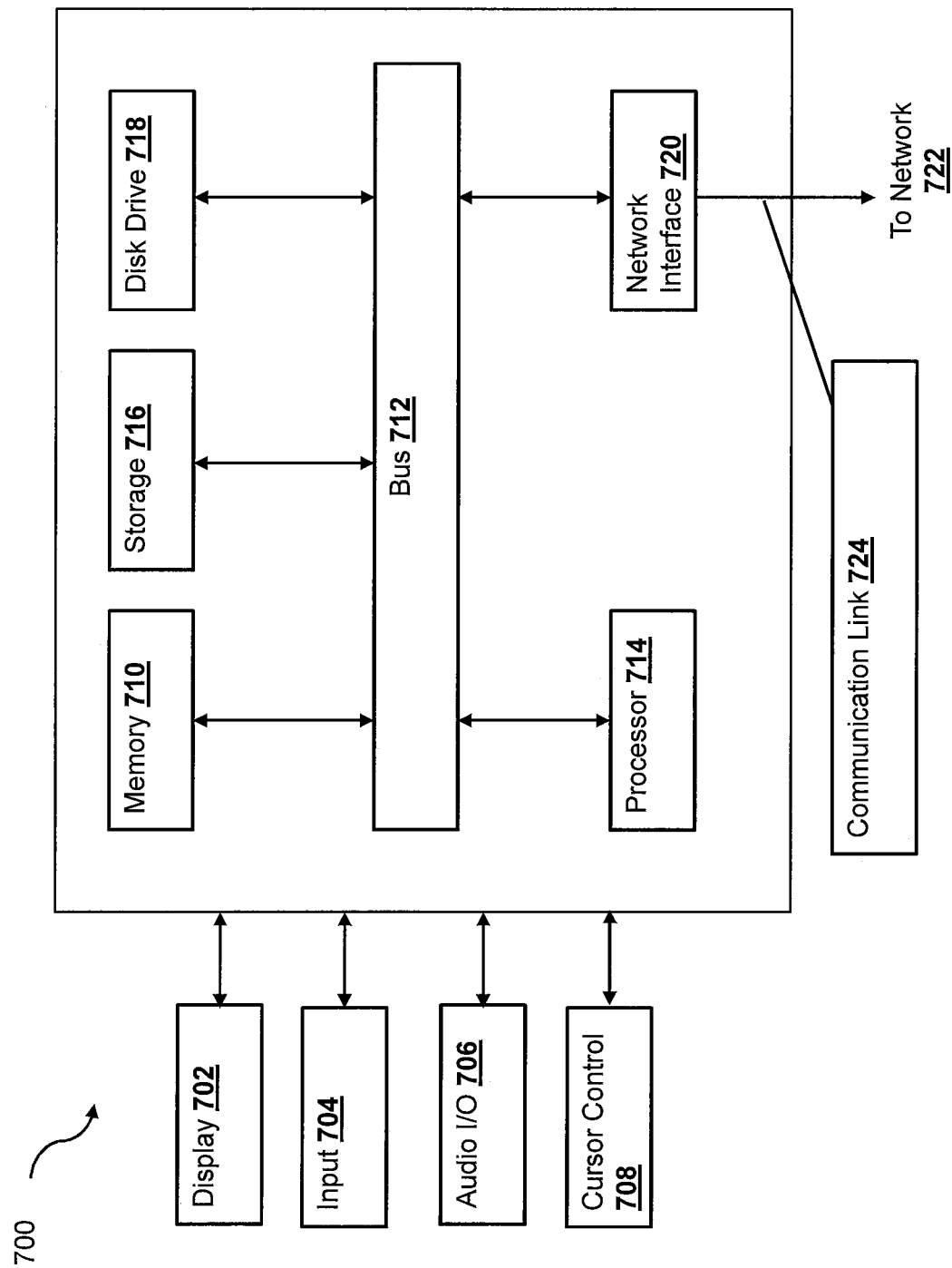
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, and the user devices 110 and 112. In various implementations, each of the user devices 110 and 112 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 112, 120, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account, a transaction page for initiating an electronic transaction, an account summary page for presenting a summary of information associated with an account, or a transaction history page for presenting information associated with one or more transactions associated with an account. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid state drive, a hard drive). The computer system 700 performs specific operations by the processor 714 and other components by executing one or more sequences of instructions contained in the system memory component 710. For example, the processor 714 can perform the information extraction functionalities described herein according to the process 300.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
    a non-transitory memory; and
    one or more hardware processors coupled with the non-transitory memory and configured to read instructions from the non-transitory memory to cause the system to perform operations comprising:
        segmenting an image into a plurality of image segments;
        determining that at least a first image segment in the plurality of image segments comprises obfuscated data;
        deriving attributes associated with unobfuscated data in a subset of image segments in the plurality of image segments;
        determining a layout of the image based on the unobfuscated data in the subset of image segments and relative positions of the subset of image segments within the image;
        generating restored data for the obfuscated data based on the layout of the image and the derived attributes associated with the unobfuscated data;
        determining that the image comprises transaction data associated with one or more electronic transactions based on the restored data; and
        configuring a risk engine to assess a risk level of incoming electronic transaction requests based at least in part on the transaction data.

2. The system of claim 1, wherein the derived attributes comprise at least one of a data type associated with the unobfuscated data, a font type associated with the unobfuscated data, a font size associated with the unobfuscated data, or a particular character existing in the unobfuscated data.

3. The system of claim 1, wherein the operations further comprise:
    determining a first data obfuscation algorithm used to generate the obfuscated data; and
    selecting, from a plurality of data restoration algorithms, a first data restoration algorithm corresponding to the first data obfuscation algorithm.

4. The system of claim 3, wherein the obfuscated data is first obfuscated data, wherein the restored data is first restored data, and wherein the operations further comprise:
    determining that a second image segment in the plurality of image segments comprises second obfuscated data;
    determining a second data obfuscation algorithm used to generate the second obfuscated data, wherein the second data obfuscation algorithm is different from the first data obfuscation algorithm;
    selecting, from the plurality of data restoration algorithms, a second data restoration algorithm corresponding to the second data obfuscation algorithm; and
    generating second restored data for the second obfuscated data using the second data restoration algorithm based on the layout of the image and the derived attributes.

5. The system of claim 3, wherein the operations further comprise extracting metadata from the image, wherein the first data restoration algorithm is selected from the plurality of data restoration algorithms based at least in part on the extracted metadata.

6. The system of claim 5, wherein the metadata comprises data indicating a computing environment in which the image was captured and/or edited.

7. The system of claim 3, wherein the determining the first data obfuscation algorithm used to generate the obfuscated data comprises:
    calculating a variance measure based on pixel data in the first image segment; and
    determining that the variance measure is within a predetermined variance range corresponding to a blurriness measure.

8. The system of claim 3, wherein the determining the first data obfuscation algorithm used to generate the obfuscated data comprises:
    calculating a standard deviation based on pixel data within the first image segment; and
    determining that the standard deviation is below a predetermined threshold corresponding to a masking measure.

9. The system of claim 1, wherein the operations further comprise modifying an authentication setting associated with a user account based at least in part on the restored data.

10. A method comprising:
    segmenting, by one or more hardware processors, an image into a plurality of image segments;
    determining, by the one or more hardware processors, that at least a first image segment in the plurality of image segments comprises obfuscated data;
    deriving, by the one or more hardware processors, attributes associated with unobfuscated data in a subset of image segments in the plurality of image segments;
    determining, by the one or more hardware processors, a layout of the image based on the unobfuscated data in the subset of image segments and relative positions of the subset of image segments within the image;

generating, by the one or more hardware processors, restored data for the obfuscated data based on the layout of the image and the derived attributes;

determining that the image comprises transaction data associated with one or more electronic transactions based on the restored data; and configuring a risk engine to assess a risk level of incoming electronic transaction requests based at least in part on the transaction data.

11. The method of claim 10, further comprising:
determining a computing environment in which the image was captured and/or edited.

12. The method of claim 11, further comprising extracting metadata from the image, wherein the computing environment is determined based on the extracted metadata.

13. The method of claim 11, wherein the restored data is generated further based on the computing environment.

14. The method of claim 10, wherein the derived attributes comprise at least one of a data type associated with the unobfuscated data, a font type associated with the unobfuscated data, or a font size associated with the unobfuscated data.

15. A non-transitory machine-readable medium having stored thereon machine-readable instructions executable to cause a machine to perform operations comprising:
segmenting an image into a plurality of image segments;
determining that at least a first image segment in the plurality of image segments comprises obfuscated data;
analyzing unobfuscated data in a subset of image segments in the plurality of image segments;
deriving attributes associated with the unobfuscated data based on the analyzing;
determining a layout of the image based on the unobfuscated data in the subset of image segments and relative positions of the subset of image segments within the image;
generating restored data for the obfuscated data based on the layout of the image and the derived attributes;
determining that the image comprises transaction data associated with one or more electronic transactions based on the restored data; and
configuring a risk engine to assess a risk level of incoming electronic transaction requests based at least in part on the transaction data.

16. The non-transitory machine-readable medium of claim 15, wherein the restored data comprises text data.

17. The non-transitory machine-readable medium of claim 15, wherein the image corresponds to a webpage associated with a service provider.

18. The non-transitory machine-readable medium of claim 15, wherein the derived attributes comprise at least one of a data type associated with the unobfuscated data, a font type associated with the unobfuscated data, a font size associated with the unobfuscated data, or a particular character existing in the unobfuscated data.

19. The non-transitory machine-readable medium of claim 15, wherein the operations further comprise:
determining a data obfuscation algorithm used to generate the obfuscated data; and
selecting, from a plurality of data restoration algorithms, a data restoration algorithm corresponding to the data obfuscation algorithm.

20. The non-transitory machine-readable medium of claim 15, wherein the operations further comprise modifying an authentication setting associated with a user account based at least in part on the restored data.

* * * * *